US010248258B2

(12) United States Patent
Liu et al.

(10) Patent No.: US 10,248,258 B2
(45) Date of Patent: Apr. 2, 2019

(54) TOUCH CONTROL STRUCTURE, TOUCH CONTROL DISPLAY PANEL AND TOUCH CONTROL DISPLAY DEVICE HAVING THE SAME, AND METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Haisheng Wang, Beijing (CN); Xiaoliang Ding, Beijing (CN); Changfeng Li, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 471 days.

(21) Appl. No.: 15/030,591

(22) PCT Filed: Dec. 10, 2015

(86) PCT No.: PCT/CN2015/096936
§ 371 (c)(1),
(2) Date: Apr. 19, 2016

(87) PCT Pub. No.: WO2016/176995
PCT Pub. Date: Nov. 10, 2016

(65) Prior Publication Data
US 2018/0136784 A1 May 17, 2018

(30) Foreign Application Priority Data
May 4, 2015 (CN) .......................... 2015 1 0220985

(51) Int. Cl.
G06F 3/041 (2006.01)
G06F 3/044 (2006.01)

(52) U.S. Cl.
CPC ............ *G06F 3/0418* (2013.01); *G06F 3/044* (2013.01); *G06F 3/0412* (2013.01); *G06F 2203/04111* (2013.01)

(58) Field of Classification Search
None
See application file for complete search history.

(56) References Cited

U.S. PATENT DOCUMENTS

2013/0076646 A1* 3/2013 Krah .................... G06F 3/0414
345/173
2013/0278542 A1* 10/2013 Stephanou ............ G06F 3/0414
345/174

FOREIGN PATENT DOCUMENTS

CN 101923415 A 12/2010
CN 102073402 A 5/2011
(Continued)

OTHER PUBLICATIONS

International Search Report & Written Opinion dated Feb. 26, 2016 regarding PCT/CN2015/096936.

*Primary Examiner* — Stephen T. Reed
(74) *Attorney, Agent, or Firm* — Intellectual Valley Law, P.C.

(57) ABSTRACT

The present application discloses a touch control structure comprising a first touch electrode comprising a first touch sub-electrode and a second touch sub-electrode. A sensing area of the first touch sub-electrode is substantially the same as a sensing area of the second touch sub-electrode.

19 Claims, 5 Drawing Sheets

(56) References Cited

FOREIGN PATENT DOCUMENTS

| | | |
|---|---|---|
| CN | 102331891 A | 1/2012 |
| CN | 103902094 A | 7/2014 |
| CN | 103927069 A | 7/2014 |
| CN | 104793799 A | 7/2015 |
| JP | 2014206844 A | 10/2014 |

* cited by examiner

FIG. 7

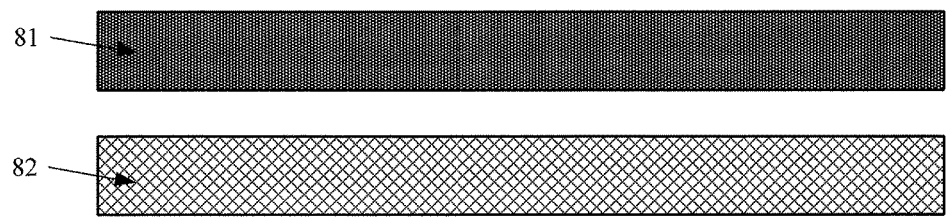

| Transmitting a signal from the first touch sub-electrode to the non-inverting input terminal. |

↓

| Transmitting a signal from the second touch sub-electrode to the inverter thereby generating an inverted signal; transmitting the inverted signal from the inverter to the inverting terminal. |

↓

| Performing a difference operation on the signal received from the non-inverting input terminal and the signal received from the inverting input terminal. |

TOUCH CONTROL STRUCTURE, TOUCH CONTROL DISPLAY PANEL AND TOUCH CONTROL DISPLAY DEVICE HAVING THE SAME, AND METHOD THEREOF

CROSS-REFERENCE TO RELATED APPLICATION

This application is a national stage application under 35 U.S.C. § 371 of International Application No. PCT/CN2015/096936 filed Dec. 10, 2015, which claims priority to Chinese Patent Application No. 201510220985.3, filed May 4, 2015, the contents of which are incorporated by reference in the entirety.

FIELD

The present invention relates to display technology, more particularly, to a touch control structure, a touch control display panel and a touch control display device having the same, and a touch control driving method thereof.

BACKGROUND

In an out-cell touch control panel, a touch module is added onto a display module. The two modules can be manufactured separately. The in-cell touch control technology integrates the touch sensor within the display unit. The display panel does not need to be bonded with an additional touch panel so as to simplify the assembly procedure.

SUMMARY

In one aspect, the present invention provides a touch control structure comprising a first touch electrode comprising a first touch sub-electrode and a second touch sub-electrode. A sensing area of the first touch sub-electrode is substantially the same as a sensing area of the second touch sub-electrode.

Optionally, the touch control structure further comprises a difference operator, and an inverter. The first touch sub-electrode is connected to a non-inverting input terminal of the difference operator. The second touch sub-electrode is connected to an inverting input terminal of the difference operator through the inverter. The difference operator performs a difference operation between a signal received from the non-inverting input terminal and a signal received from the inverting input terminal.

Optionally, the first touch sub-electrode comprises a first bridge, a plurality of first teeth integral with the first bridge and extending from the first bridge toward free ends of the plurality of first teeth; the second touch sub-electrode comprises a second bridge, a plurality of second teeth integral with the second bridge and extending from the second bridge toward free ends of the plurality of second teeth; the first bridge and the second bridge are spaced apart and optionally arranged substantially along a first direction on a first plane; each of the plurality of first teeth and each of the plurality of second teeth are spaced apart and arranged substantially along a second direction on a second plane; the number of the plurality of first teeth is the same as the number of the plurality of second teeth, the shape of each of the plurality of first teeth and each of the plurality of second teeth is substantially the same.

Optionally, each of the plurality of first teeth and each of the plurality of second teeth are alternately arranged along the second direction and spaced apart so that the first touch sub-electrode 81 and the second touch sub-electrode are interleaving.

Optionally, the plurality of first teeth is sandwiched by the plurality of second teeth so that some of the plurality of second teeth are disposed on one side of the plurality of first teeth and some of the plurality of second teeth are disposed on an opposite side of the plurality of first teeth, and the plurality of first teeth are disposed in the middle.

Optionally, the plurality of second teeth is sandwiched by the plurality of first teeth so that some of the plurality of first teeth are disposed on one side of the plurality of second teeth and some of the plurality of first teeth are disposed on an opposite side of the plurality of second teeth, and the plurality of second teeth are disposed in the middle.

Optionally, the numbers of the plurality of second teeth on the one side and the opposite side of the plurality of first teeth are the same, the plurality of first teeth has an even number of teeth.

Optionally, the numbers of the plurality of first teeth on the one side and the opposite side of the plurality of second teeth are the same, the plurality of second teeth has an even number of teeth.

Optionally, the first touch electrode comprises a plurality of electrode teeth comprising the plurality of first teeth and the plurality of second teeth, each of the plurality of electrode teeth is neighbored by either one of the plurality of first teeth and/or one of the plurality of second teeth; the plurality of electrode teeth are substantially evenly distributed on the second plane.

Optionally, the first touch sub-electrode and the second touch sub-electrode are bar electrodes.

Optionally, the touch control structure is a mutual capacitive touch control structure, and the touch control structure further comprises a second touch electrode.

In another aspect, the present invention also provides a touch control display panel comprising a touch control structure described herein.

In another aspect, the present invention further provides a touch control display device comprising a touch control display panel described herein.

In another aspect, the present invention further provides a touch control driving method for driving a touch control display panel. The method comprises transmitting a signal from the first touch sub-electrode to the non-inverting input terminal; transmitting a signal from the second touch sub-electrode to the inverter thereby generating an inverted signal; transmitting the inverted signal from the inverter to the inverting terminal; and performing a difference operation on the signal received from the non-inverting input terminal and the signal received from the inverting input terminal.

Optionally, the method further comprises performing inversion operation on the signal from the second touch sub-electrode and generating the inverted signal.

Optionally, the touch control display panel is a mutual capacitive touch control display panel, the method further comprises providing touch scanning signals to the second touch electrode.

BRIEF DESCRIPTION OF THE FIGURES

The following drawings are merely examples for illustrative purposes according to various disclosed embodiments and are not intended to limit the scope of the present invention.

FIG. 7 is a diagram illustrating the structures of a first touch sub-electrode and a second touch sub-electrode in another embodiment.

FIG. 8 is a flow chart illustrating an exemplary touch control driving method in an embodiment.

DETAILED DESCRIPTION OF THE EMBODIMENTS

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Figure 1:
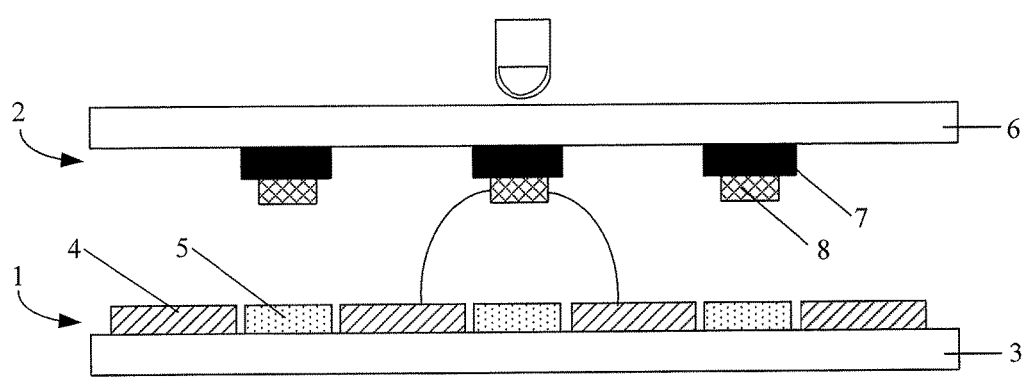
FIG. 1 is a cross-sectional view of a conventional in-cell touch control display panel.
Figure 2:
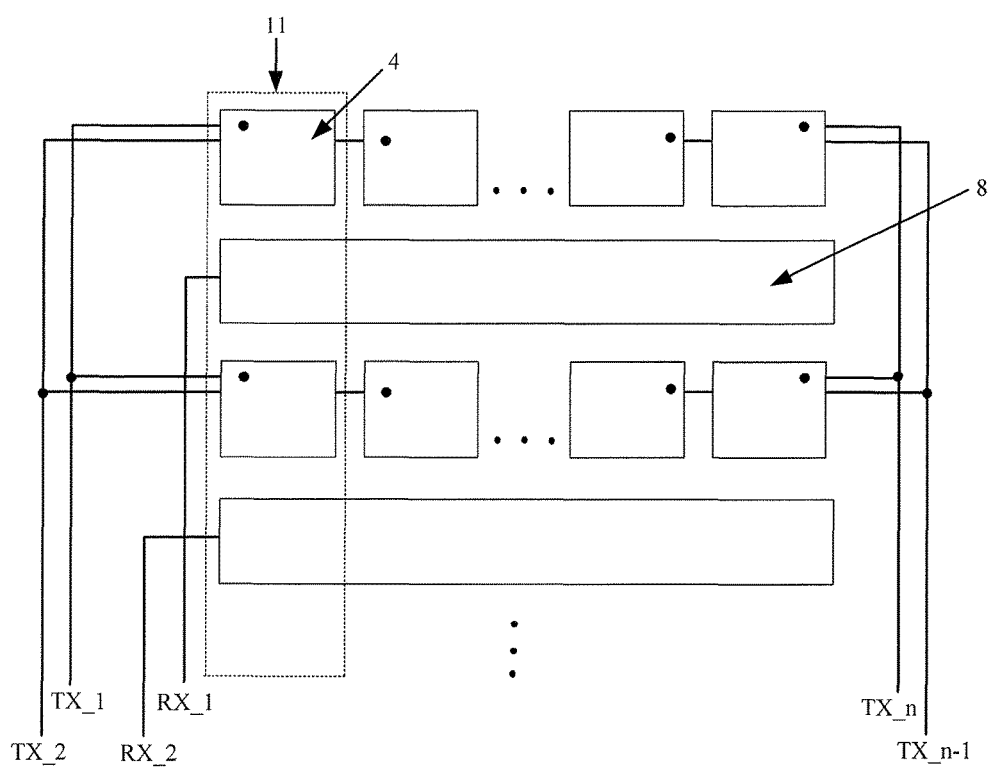
FIG. 2 is a diagram illustrating the structure of a conventional in-cell touch control display panel in plan view.

FIG. 1 is a cross-sectional view of a conventional in-cell touch control display panel. FIG. 2 is a diagram illustrating the structure of a conventional in-cell touch control display panel in plan view. The touch control panel in FIGS. 1 and 2 includes an array substrate 1 and a color filter substrate 2 facing each other. The touch control structure in the display panel includes a plurality of touch scanning electrodes 11 and a plurality of touch sensing electrodes 8 alternately arranged within the touch display panel. The touch scanning electrodes 11 are disposed on the array substrate, and the touch sensing electrodes 8 are disposed on the color filter substrate.

Specifically, the array substrate 1 includes a first base substrate 3 and a common electrode layer disposed on the first base substrate 3. The common electrode layer includes a plurality of plate sub-electrodes 4 and a plurality of bar sub-electrode 5 extending along the row direction. The sub-electrodes 5 and the sub-electrodes 4 are alternately arranged along the column direction. The sub-electrodes 4 in the same column are connected to form the touch scanning electrode 11. During display mode, a common voltage signal $V_{com}$ is applied to the touch scanning electrode 11. During touch control mode, a touch control scanning signal TX_1, TX_2, . . . , TX_n−1, or TX_n is applied to the touch scanning electrode 11.

The color filter substrate 2 includes a second base substrate 6, and a black matrix 7 disposed on the second base substrate 6. The black matrixes 7 define a pixel region and a light shielding region. The touch sensing electrodes 8 are disposed on a light shielding region, facing the sub-electrode 5 on the array substrate.

During touch control mode, touch control scanning signals TX_1, TX_2, TX_n−1, or TX_n are applied to the touch scanning electrode 11. Touch sensing signals RX_1, RX_2, RX_n−1, or RX_n are detected in the touch sensing electrode 8. A capacitance change between the touch scanning electrodes 11 and the touch sensing electrodes 8 is calculated prior to and after the touch event. The capacitance change is compared to a predetermined threshold value to determine whether or not a touch event has happened.

During a touch event (e.g., a finger touches the surface of the display panel), the touch on the surface also generates noise on the surface of the display panel. The noise may interfere detection of a signal of interest, for example, by lowering the signal to noise level.

Figure 3:
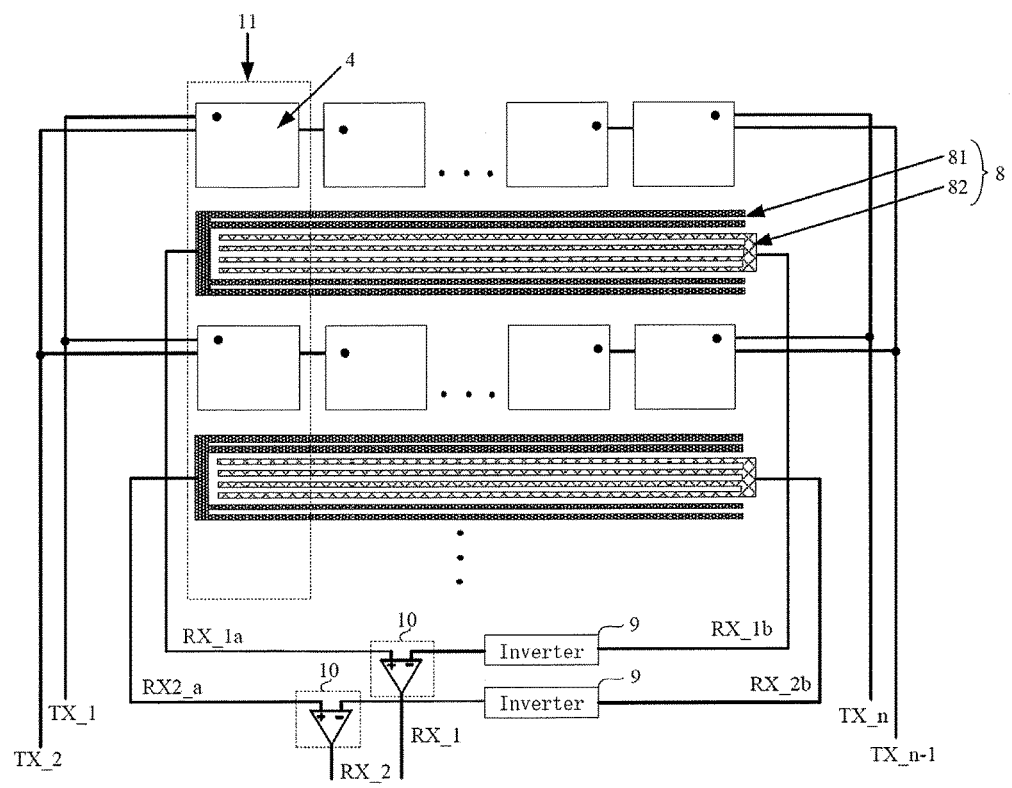
FIG. 3 is a diagram illustrating the structure of a touch control structure in an embodiment in plan view.

FIG. 3 is a diagram illustrating the structure of a touch control structure in an embodiment in plan view. FIG. 3 uses mutual capacitive type touch control as an illustrative example. The touch control structure as described herein can be a self-capacitive touch control structure or a mutual capacitive touch control structure. A mutual capacitive touch control device includes a plurality of touch scanning electrodes and a plurality of touch sensing electrodes. A self-capacitive touch control device does not require a touch scanning electrode, i.e., the touch sensing electrodes can achieve the touch control function alone.

Referring to FIG. 3, the touch control structure in the embodiment includes a first touch electrode 8 (e.g., a touch sensing electrode), a second touch electrode 11 (e.g., a touch scanning electrode), a difference operator 10, and an inverter 9. The first touch electrode 8 includes a first touch sub-electrode 81 and a second touch sub-electrode 82. The first touch sub-electrode 81 is connected to a non-inverting input terminal of the difference operator 10. The second touch sub-electrode 82 is connected to an inverting input terminal of the difference operator 10 through the inverter 9. The inverter 9 performs an inversion operation on a signal received from the second touch sub-electrode 82, and generates an inverted signal. The inverted signal is then transmitted to the inverting terminal of the difference operator 10. The difference operator 10 performs a difference operation between a signal received from the non-inverting input terminal and a signal received from the inverting input terminal (e.g., the inverted signal), to obtain touch sensing signals RX_1, RX_2, RX_n−1, and RX_n.

In some embodiments, the touch control structure is a mutual capacitive touch control structure. Optionally, the second touch electrode 11 (e.g., the touch scanning electrode) includes a plurality of plate sub-electrodes 4. As shown in FIG. 3, the sub-electrodes 4 in the same column are connected to form the second touch electrode 11.

In some embodiments, the touch control structure is a self-capacitive touch control structure. Optionally, the touch control structure does not include a second touch electrode.

In some embodiments, a sensing area of the first touch sub-electrode 81 is substantially the same as a sensing area of the second touch sub-electrode 82. The sensing area refers to the area for detecting a touch event, e.g., the area of the surface of a touch sub-electrode facing the color filter substrate. In some embodiments, the sensing area is the area of the first touch electrode in contact with the color filter substrate (e.g., through a black matrix). The first touch sub-electrode 81 is connected to a non-inverting input terminal of the difference operator 10. The second touch sub-electrode 82 is connected to an inverting input terminal of the difference operator 10 through the inverter 9. The signals of interest detected by the first touch sub-electrode 81 and the second touch sub-electrode 82 are positive voltage signals. The noise signals detected by the first touch sub-electrode 81 and the second touch sub-electrode 82, however, include both positive half-waves and negative half-waves. Signal magnitudes of the positive half-waves and negative half-waves are about the same.

The present disclosure also provides a touch control structure including a first touch electrode 8 having a first touch sub-electrode 81 and a second touch sub-electrode 82. Optionally, the sensing area of the first touch sub-electrode 81 is substantially the same as the sensing area of the second touch sub-electrode 82. Optionally, the sensing area of the first touch sub-electrode 81 is not substantially the same as the sensing area of the second touch sub-electrode 82. Optionally, two sensing areas may differ by less than 1%, less than 2%, less than 3%, less than 4%, less than 5%, less than 7%, less than 10%, less than 15%, less than 20%, 1%-5%, 5%-10%, 10%-15%, 15%-20%, etc.

Figure 4:
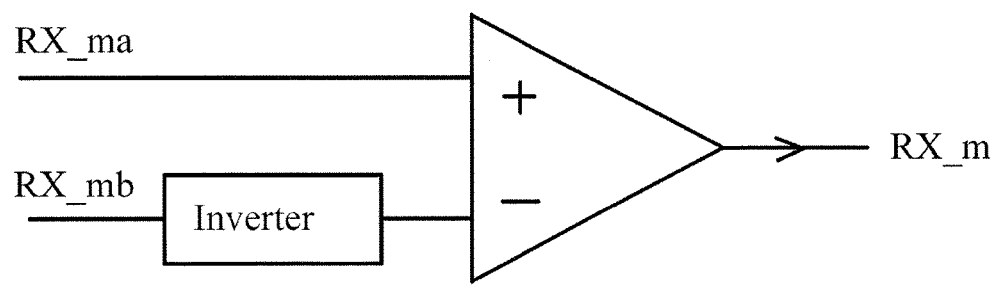
FIG. 4 is a diagram illustrating an exemplary method of reducing touch noise in an embodiment.

FIG. 4 is a diagram illustrating an exemplary method of reducing touch noise in an embodiment. Referring to FIG. 4, during a touch event, an object touches an area corresponding to a first touch electrode 8. The first touch sub-electrode 81 generates a first sensing signal RX_ma, including a first signal of interest and a first noise signal. The second touch sub-electrode 82 generates a second sensing signal RX_mb including a second signal of interest and a second noise signal. When the sensing area of the first touch sub-electrode 81 is substantially the same as a sensing area of the second touch sub-electrode 82, the signal magnitudes of the first signal of interest and the second signal of interest are also substantially the same. The signal magnitudes of the first noise signal and the second noise signal are substantially the same.

The inverter 9 performs an inversion operation on the second noise signal. The positive half-waves are converted into negative half-waves, and the negative half-waves are converted into positive half-waves. Because the signal magnitudes of the positive half-waves and the negative half-waves are about the same, the signal magnitudes of the second noise signal remains substantially unchanged after the inversion operation.

Based on the above, the signal received by the non-inverting terminal of the difference operator 10 includes a first signal of interest and a first noise signal. The signal received by the inverting terminal includes an inverted second signal of interest and an inverted (but unchanged) second noise signal. The difference operator 10 then performs a difference operation on signals received by the non-inverting terminal and the inverting terminal. The first noise signal is offset by the inverted (but unchanged) second noise signal. The first signal of interest and the second signal of interest are not offset by each other and are converted into touch sensing signal RX_m. Accordingly, the touch noise can be reduced or eliminated.

Optionally, the sensing area of the first touch sub-electrode 81 is not substantially the same as the sensing area of the second touch sub-electrode 82. For example, two sensing areas can differ by less than 1%, less than 2%, less than 3%, less than 4%, less than 5%, less than 7%, less than 10%, less than 15%, less than 20%, 1%-5%, 5%-10%, 10%-15%, 15%-20%, etc. When the sensing area of the first touch sub-electrode 81 is not substantially the same as a sensing area of the second touch sub-electrode 82, the first noise signal is not completely offset by the second noise signal, i.e., it is only partially offset by the second noise signal. Nonetheless, the signal-to-noise ratio output from the difference operator 10 can be much reduced whether or not two sensing areas are substantially the same. For example, the signal-to-noise ratio can be reduced by more than 99.9%, more than 99%, more than 95%, more than 90%, more than 85%, more than 80%, more than 75%, more than 70%, more than 65%, more than 60%, etc., as compared to a touch control structure not having a difference operator 10 and an inverter 9 described herein, or a touch control structure not having the first touch sub-electrode 81 and the second touch sub-electrode 82 described herein.

Figure 5:
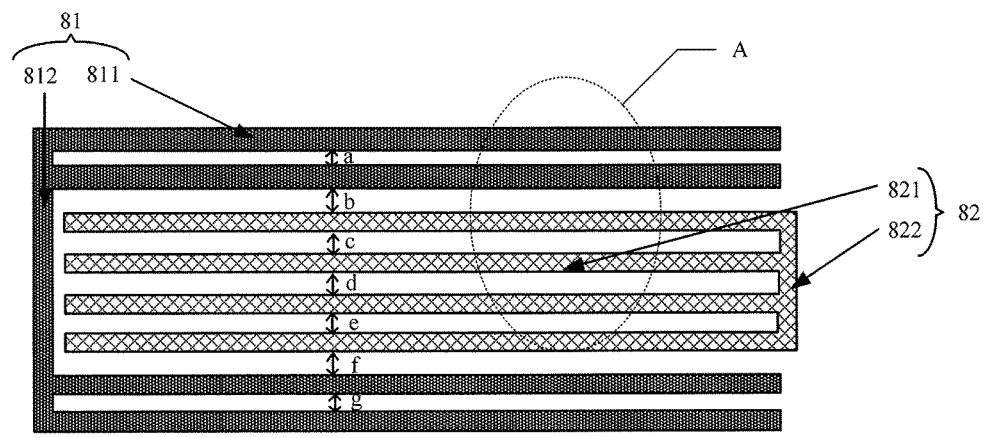
FIG. 5 is a diagram illustrating the structures of a first touch sub-electrode and a second touch sub-electrode in an embodiment.

FIG. 5 is a diagram illustrating the structures of a first touch sub-electrode 81 and a second touch sub-electrode 82 in an embodiment. Referring to FIG. 5, the first touch sub-electrode 81 includes a first bridge 812, a plurality of first teeth 811 integral with the first bridge 812 and extending from the first bridge 812 toward free ends of the plurality of first teeth 811. The second touch sub-electrode 82 includes a second bridge 822, a plurality of second teeth 821 integral with the second bridge 822 and extending from the second bridge 822 toward free ends of the plurality of second teeth 821. The first bridge 812 and the second bridge 822 are spaced apart. Each of the plurality of first teeth 811 and each of the plurality of second teeth 821 are also spaced apart.

Optionally, the number of the plurality of first teeth 811 is the same as the number of the plurality of second teeth 821. Optionally, the shape of each of the plurality of first teeth 811 and the shape of each of the plurality of second teeth 821 are substantially the same.

Optionally, the first bridge 812 is arranged substantially along a first bridge direction on a first bridge plane. Optionally, the second bridge 822 is arranged substantially along a second bridge direction on a second bridge plane. Optionally, the first bridge 812 and the second bridge 822 are spaced apart and arranged substantially along a same first direction on a same first plane.

Optionally, the plurality of first teeth 811 are arranged substantially along a first teeth direction on a first teeth plane. Optionally, the plurality of second teeth 821 are arranged substantially along a second teeth direction on a second teeth plane. Optionally, each of the plurality of first teeth 811 and each of the plurality of second teeth 821 are spaced apart and arranged substantially along a same second direction on a same second plane.

Optionally, the first plane is the same as the second plane. Optionally, the first direction is the column direction in FIG. 3. Optionally, the second direction is the row direction in FIG. 3.

In some embodiments, a plurality of second teeth 821 is sandwiched by a plurality of first teeth 811 on each side. In one example, the plurality of second teeth 821 are disposed in the middle. Some of the plurality of first teeth 811 are disposed on one side of the plurality of second teeth 821. Some of the plurality of first teeth 811 are disposed on an opposite side of the plurality of second teeth 821. As shown in FIG. 5, an exemplary touch control structure can have four second teeth 821 disposed in the middle, with two first teeth 811 on one side and two other first teeth 811 on the other side. Optionally, the numbers of the first teeth 811 on the one side and the opposite side of the second teeth 821 are the same, and the number of the second teeth 821 is an even number. Further, the total number of first teeth 811 may the same as the total number of the second teeth 821.

In some embodiments, a plurality of first teeth 811 is sandwiched by a plurality of second teeth 821 on each side. In one example, the plurality of first teeth 811 are disposed in the middle. Some of the plurality of second teeth 821 are disposed on one side of the plurality of first teeth 811. Some of the plurality of second teeth 821 are disposed on an opposite side of the plurality of first teeth 811. For example, a touch control structure can have four first teeth 811 disposed in the middle, with two second teeth 821 on one side and two other second teeth 821 on the other side. Optionally, the numbers of the second teeth 821 on the one side and the opposite side of the first teeth 811 are the same, and the number of the first teeth 821 is an even number. Further, the total number of first teeth 811 may the same as the total number of the second teeth 821.

The first teeth 811 and the second teeth 821 can be arranged in any suitable patterns. Each electrode teeth (first or second) may be neighbored by either a first teeth 811 and/or a second teeth 821. That is, each electrode teeth may be neighbored by only first teeth 811, or only second teeth 821, or one first tooth 811 and one second tooth 821. Optionally, the electrode teeth are substantially evenly distributed on the second plane, i.e., the distances between all neighboring electrode teeth are substantially the same. For example, the distances a, b, c, d, e, f, g in FIG. 5 are substantially the same.

When the shape of each first teeth 811 and the shape each second teeth 821 are substantially the same, they generate substantially the same signals of interest, and substantially the same noise signals. When the distances between all neighboring electrode teeth are substantially the same, crosstalk between any neighboring electrode teeth is also substantially the same. The crosstalk between neighboring electrode teeth can be predetermined by experiment. During a touch control detection process, interference to the signal of interest due to the crosstalk can be adjusted (e.g., canceled or reduced) using the predetermined value, further enhancing the accuracy of touch signal detection.

During a touch event, an object touches the surface of the display panel. Sometimes, the object only touches a portion of the first touch electrode 8. When this happens, the number of first teeth 811 and the number of second teeth 821 corresponding to the touched area may not be the same. For example, when an object touches the area A in FIG. 5, the area A corresponds to two first teeth 811 and four second teeth 821. Accordingly, the noise signal detected in the first sensing sub-electrode 81 is not the same as the noise signal detected in the second sensing sub-electrode 82. As a result, the noise signal detected in the first sensing sub-electrode 81 is not substantially completely offset by the second sensing sub-electrode 82 during the difference operation followed by an inversion operation.

Figure 6:
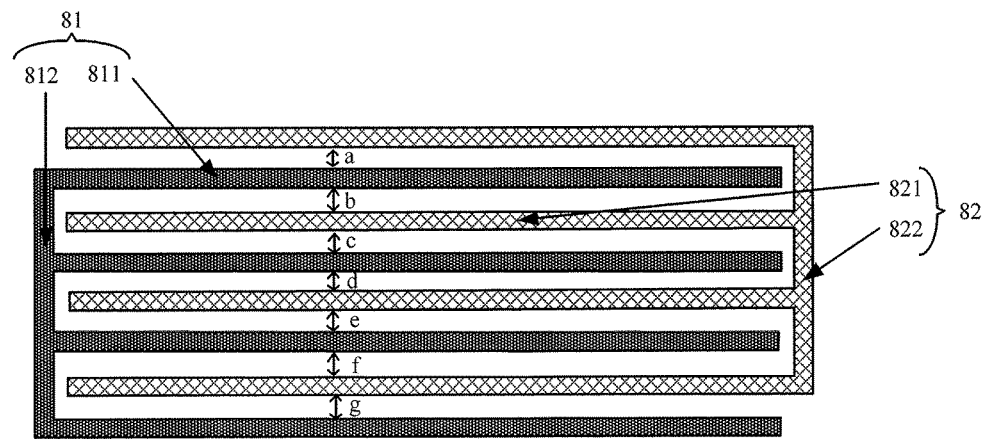
FIG. 6 is a diagram illustrating the structures of a first touch sub-electrode and a second touch sub-electrode in another embodiment.

FIG. 6 is a diagram illustrating the structures of a first touch sub-electrode and a second touch sub-electrode in another embodiment. Referring to FIG. 6, each of the plurality of first teeth 811 and each of the plurality of second teeth 821 are alternately arranged along the second direction and spaced apart so that the first touch sub-electrode 81 and the second touch sub-electrode are interleaving. That is, each first tooth 811 is neighbored by only the second teeth 821, and each second tooth 821 is neighbored by only the first teeth 811.

During a touch event, even if the number of first teeth 811 and the number of second teeth 821 corresponding to the touched area are not the same, the noise can be substantially completely offset by using a touch control structure as shown in FIG. 6. Because each of the first teeth 811 and each of the second teeth 821 are alternately arranged along the second direction and spaced apart, the distribution densities of the first teeth 811 and the second teeth 821 are substantially the same within the touched surface. Therefore, the number of the first teeth 811 and the number of the second teeth 821 within the touched area are always substantially the same. Accordingly, the noise signal detected in the first sensing sub-electrode 81 is substantially the same as the noise signal detected in the second sensing sub-electrode 82. As a result, the noise signal detected in the first sensing sub-electrode 81 can be substantially completely offset by the second sensing sub-electrode 82 during the difference operation followed by an inversion operation.

In some embodiments, each first tooth 811 is neighbored by only the second teeth 821, and each second tooth 821 is neighbored by only the first teeth 811 (as shown in FIG. 6). Optionally, the electrode teeth (first and second) are substantially evenly distributed on the second plane. That is, the distances between all neighboring electrode teeth are substantially the same. For example, the distances a, b, c, d, e, f, g in FIG. 6 are substantially the same).

FIG. 7 is a diagram illustrating the structures of a first touch sub-electrode and a second touch sub-electrode in another embodiment. Referring to FIG. 7, the first touch sub-electrode 81 and the second touch sub-electrode 82 are both bar electrodes. Optionally, the first touch sub-electrode 81 and the second touch sub-electrode 82 are disposed parallel to each other.

Any suitable first touch electrode structures may be used in connection with the touch control structure described herein. In some embodiments, the number of the first teeth 811 is not the same as the number of the second teeth 821. The sensing area of each first tooth 811 is not the same as the sensing area of each second tooth 821. However, the total sensing area of the first touch sub-electrode 81 is substantially the same as the total sensing area of the second touch sub-electrode 82. Accordingly, the noise generated by the first touch sub-electrode 81 is substantially the same as the noise generated by the second touch sub-electrode 82. The noise signals offset each other during the difference operation followed by the inversion operation.

FIG. 8 is a flow chart illustrating an exemplary touch control driving method in an embodiment. Referring to FIG. 8, the method in the embodiment includes transmitting a signal from the first touch sub-electrode to the non-inverting input terminal; transmitting a signal from the second touch sub-electrode to the inverter thereby generating an inverted signal; transmitting the inverted signal from the inverter to the inverting terminal; and performing a difference operation on the signal received from the non-inverting input terminal and the signal received from the inverting input terminal.

After the signal from the second touch sub-electrode is transmitted to the inverter, the method further includes performing inversion operation on the signal from the second touch sub-electrode, and generating an inverted signal. As discussed above, the second signal of interest is a positive voltage signal. The second noise signal includes both positive half-waves and negative half-waves. The signal magnitudes of the positive half-waves and the negative half-waves are about the same. After the inversion operation, the second signal of interest is converted into a negative voltage signal. The positive half-waves of the second noise signal are converted into negative half-waves. The negative half-waves are converted into positive half-waves. Because the signal magnitudes of the positive half-waves and the negative half-waves of the second noise signal are about the same, the signal magnitudes of the second noise signal remains substantially unchanged after the inversion operation.

In the step of performing a difference operation, the difference operator performs a difference operation on the signal received from the non-inverting input terminal and the signal received from the inverting input terminal. As discussed above, the noise signal from the first sensing sub-electrode is at least partially offset by the noise signal from the second sensing sub-electrode, if not substantially completely offset. The signal of interest from the second touch sub-electrode is added to the signal of interest from the first touch sub-electrode, generating the touch sensing signal. The noise is substantially reduced or eliminated, and the signal-to-noise ratio is enhanced.

In some embodiments, the touch control display panel is a mutual capacitive touch control display panel. The method further includes providing touch scanning signals to the second touch electrode, e.g., a touch scanning electrode.

In the step of providing touch scanning signals to the second touch electrode, a touch scan driving circuit in touch control mode generates touch control scanning signals. The touch control scanning signals scan the second touch electrodes on the array substrate one-by-one.

The present disclosure further provides a touch control display panel having a display panel and a touch control structure described herein. Optionally, the display panel is an Advanced Super Dimension Switch (ADS) display panel. Optionally, the touch control structure described herein is embedded within the display panel. Optionally, the second touch electrodes are disposed on a same layer as the common electrodes. Optionally, the second touch electrode and the common electrode are operated in a time-division driving mode. Optionally, the second touch electrodes are disposed on the color filter substrate.

The present disclosure further provides a touch control display device having a touch control display panel described herein.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch control structure, comprising a first touch electrode comprising a first touch sub-electrode and a second touch sub-electrode, a difference operator, and an inverter;

wherein a sensing area of the first touch sub-electrode is substantially same as a sensing area of the second touch sub-electrode;

the first touch sub-electrode and the second touch sub-electrode are insulated from each other during a touch event on the first touch electrode;

the first touch sub-electrode is directly connected to a non-inverting input terminal of the difference operator;

the second touch sub-electrode is directly connected to an inverting input terminal of the difference operator through the inverter;

the inverter performs an inversion operation on a signal received from the second touch sub-electrode, and generates an inverted signal, the inverted signal being transmitted to the inverting terminal of the difference operator; and the difference operator performs a difference operation between a signal received from the non-inverting input terminal and a signal received from the inverting input terminal.

2. The touch control structure of claim 1, wherein
the first touch sub-electrode comprises a first bridge, a plurality of first teeth integral with the first bridge and extending from the first bridge toward free ends of the plurality of first teeth;
the second touch sub-electrode comprises a second bridge, a plurality of second teeth integral with the second bridge and extending from the second bridge toward free ends of the plurality of second teeth;
the first bridge and the second bridge are spaced apart and optionally arranged substantially along a first direction on a first plane;
each of the plurality of first teeth and each of the plurality of second teeth are spaced apart and arranged substantially along a second direction on a second plane; and
a number of the plurality of first teeth is same as a number of the plurality of second teeth, a shape of each of the plurality of first teeth and each of the plurality of second teeth is substantially same.

3. The touch control structure of claim 2, wherein each of the plurality of first teeth and each of the plurality of second teeth are alternately arranged along the second direction and spaced apart so that the first touch sub-electrode and the second touch sub-electrode are interleaving.

4. The touch control structure of claim 2, wherein the plurality of first teeth is sandwiched by the plurality of second teeth so that some of the plurality of second teeth are disposed on a first side of the plurality of first teeth and some of the plurality of second teeth are disposed on a second side of the plurality of first teeth, and the plurality of first teeth are disposed in middle, the second side substantially opposite to the first side.

5. The touch control structure of claim 4, wherein numbers of the plurality of second teeth on the first side and the second side of the plurality of first teeth are same, the plurality of first teeth has an even number of teeth.

6. The touch control structure of claim 2, wherein the plurality of second teeth is sandwiched by the plurality of first teeth so that some of the plurality of first teeth are disposed on a first side of the plurality of second teeth and some of the plurality of first teeth are disposed on a second side of the plurality of second teeth, and the plurality of second teeth are disposed in middle, the second side substantially opposite to the first side.

7. The touch control structure of claim 6, wherein numbers of the plurality of first teeth on the first side and the second side of the plurality of second teeth are same, the plurality of second teeth has an even number of teeth.

8. The touch control structure of claim 3, wherein
the first touch electrode comprises a plurality of electrode teeth comprising the plurality of first teeth and the plurality of second teeth, each of the plurality of electrode teeth is neighbored by either one of the plurality of first teeth and/or one of the plurality of second teeth; and
the plurality of electrode teeth are substantially evenly distributed on the second plane.

9. The touch control structure of claim 1, wherein the first touch sub-electrode and the second touch sub-electrode are bar electrodes.

10. The touch control structure of claim 1, wherein the touch control structure is a mutual capacitive touch control structure, the touch control structure further comprising a second touch electrode.

11. A touch control display panel comprising a touch control structure of claim 1.

12. A touch control display device comprising a touch control display panel of claim 11.

13. A touch control driving method for driving a touch control display panel comprising a touch control structure of claim 1, comprising:
transmitting a signal from the first touch sub-electrode to the non-inverting input terminal;
transmitting a signal from the second touch sub-electrode to the inverter thereby generating an inverted signal;
transmitting the inverted signal from the inverter to the inverting input terminal; and
performing a difference operation on the signal received from the non-inverting input terminal and the signal received from the inverting input terminal.

14. The method of claim 13, further comprising:
performing inversion operation on the signal from the second touch sub-electrode and generating the inverted signal.

15. The method of claim 14, wherein the touch control display panel is a mutual capacitive touch control display panel;
the touch control structure further comprising a second touch electrode; and
the method further comprising providing touch scanning signals to the second touch electrode.

16. The touch control structure of claim 1, wherein
the first touch sub-electrode comprises a first bridge, a plurality of first teeth integral with the first bridge and extending from the first bridge toward free ends of the plurality of first teeth;
the second touch sub-electrode comprises a second bridge, a plurality of second teeth integral with the second bridge and extending from the second bridge toward free ends of the plurality of second teeth;
the first bridge and the second bridge are spaced apart and optionally arranged substantially along a first direction on a first plane;
each of the plurality of first teeth and each of the plurality of second teeth are spaced apart and arranged substantially along a second direction on a second plane; and
a number of the plurality of first teeth is same as a number of the plurality of second teeth, a shape of each of the plurality of first teeth and each of the plurality of second teeth is substantially same.

17. The touch control structure of claim 1, wherein the touch control structure is a mutual capacitive touch control structure, the touch control structure further comprising a second touch electrode.

18. The touch control structure of claim 4, wherein the first touch electrode comprises a plurality of electrode teeth comprising the plurality of first teeth and the plurality of second teeth, each of the plurality of electrode teeth is neighbored by either one of the plurality of first teeth and/or one of the plurality of second teeth; and
the plurality of electrode teeth are substantially evenly distributed on the second plane.

19. The touch control structure of claim 5, wherein the first touch electrode comprises a plurality of electrode teeth comprising the plurality of first teeth and the plurality of second teeth, each of the plurality of electrode teeth is neighbored by either one of the plurality of first teeth and/or one of the plurality of second teeth; and
the plurality of electrode teeth are substantially evenly distributed on the second plane.

* * * * *